United States Patent Office 3,849,559
Patented Nov. 19, 1974

3,849,559
TRANQUILIZER COMPOSITION AND
METHOD OF TREATMENT
Erhard Wolf, Hofheim, Taunus, Hans Kohl, Schwalbach, Taunus, and Günter Härtfelder, Frankfurt am Main, Germany, assignors to Farbwerke Hoechst Aktiengesellschaft vormals Meister Lucius & Bruning, Frankfurt am Main, Germany
No Drawing. Continuation of application Ser. No. 140,977, May 6, 1971, now Patent No. 3,738,982.
This application Mar. 12, 1973, Ser. No. 340,209
Claims priority, application Germany, May 8, 1970, P 20 22 503.0; Sept. 23, 1970, P 20 46 848.8
Int. Cl. A61k 27/00
U.S. Cl. 424—244      18 Claims

ABSTRACT OF THE DISCLOSURE

Compositions containing effective amounts of oxo-phosphinyl-benzodiazepines are disclosed to have tranquilizing properties and are suitable for enteral or parenteral administration.

---

This is a division of Application Ser. No. 140,977 filed May 6, 1971, now U.S. Pat. 3,738,982.

The present invention relates to benzodiazepines and to a process for preparing them.

More particularly, the invention relates to derivatives of benzodiazepines of the general formula I

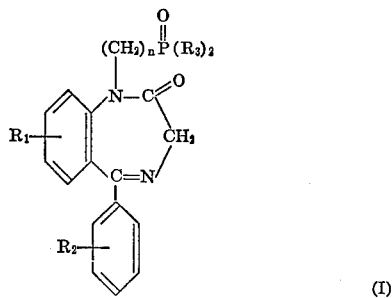

in which $R_1$ and $R_2$, which may be identical or different, each represent a hydrogen atom, a nitro group, a halogen atom or the trifluoromethyl group and $R_2$ in addition may represent a straight chain or branched alkyl group having 1 to 6 carbon atoms, $R_3$ represents a straight chain or branched alkyl group having 1 to 3 carbon atoms, and $n$ is a number from 1 to 6.

The invention furthermore provides a process for preparing the above-specified compounds, which comprises either reacting benzodiazepine derivatives of the general formula

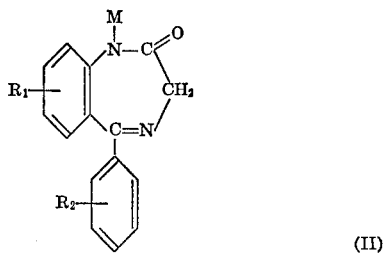

in which M represents a metal cation and $R_1$ and $R_2$ have the meanings given above, with oxophosphine compounds of the general formula III

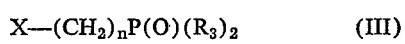

$$X—(CH_2)_nP(O)(R_3)_2 \qquad (III)$$

in which $R_3$ has the meaning given above and X represents a halogen atom or the radical of an alkane-sulfonic or aryl-sulfonic acid, or reacting o-aminobenzophenones of the general formula IV

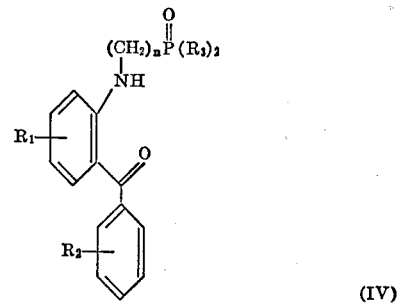

in which $R_1$, $R_2$, $R_3$ and $n$ have the meanings given above, with derivatives of amino-acetic acid, preferably with the esters thereof, or first reacting the compounds of formula IV with halides of halogenoacetic acid, then with ammonia and eventually cyclizising the compounds so obtained.

As benzodiazepines which may be used in the process of the invention and may be prepared according to known processes there may be mentioned, by way of example:

7-chloro-1,3-dihydro-5-phenyl-2H-1,4-benzodiazepine-2-one,
7-chloro-1,3-dihydro-5,2'-chlorophenyl-2H-1,4-benzodiazepine-2-one,
7-fluoro-1,3-dihydro-5,4'-isopropylphenyl-2H,1,4-benzodiazepine-2-one,
7-nitro-1,3-dihydro-5-phenyl-2H-1,4-benzodiazepine-2-one,
7-trifluoromethyl-1,3-dihydro-5-phenyl-2H-1,4-benzodiazepine-2-one,
7-chloro-1,3-dihydro-5,4'-n-octylphenyl-2H-,1,4-benzodiazepine-2-one.

The corresponding phosphine-oxides, for example chloromethyl-dimethyl-phosphine-oxide,
bromomethyl-dimethyl-phosphine-oxide,
2-chloroethyl-dimethyl-phosphine-oxide,
3-chloro-propyl-dimethylphosphine-oxide,
iodomethyl-dimethyl-phosphine-oxide,
methane-sulfonic acid-dimethyl-oxo-phosphinyl-methyl ester,
p-toluene-sulfonic acid-dimethyl-oxo-phosphinyl-methyl ester, can also be obtained according to known processes, even the afore-mentioned compounds in which the term "dimethyl" is replaced by "diethyl," "dipropyl" or "diisopropyl."

The conversion of the 1H-benzodiazepines into the corresponding metal compounds, preponderantly alkali metal compounds, can be carried out according to known methods, for example by heating with calcium hydride, sodium hydride, lithium hydride, potassium tert. butylate, sodium methylate, etc. For this purpose, the use of organic solvents is of advantage.

Depending on the reactivity of the phosphorus component, the reaction according to the invention is preferably carried out at elevated temperatures, approximately between room temperature and 200° C. It is advantageous to carry out the reaction in a solvent at the boiling temperature of this solvent. However, the reaction may also be effected in the absence of a solvent.

As solvents for the formation of the metal compound as well as for the reaction with the phosphorus compound, inert solvents, for example toluene, xylene, dimethylformamide, dimethylacetamide, tetrahydrofurane, dioxane or acetonitrile may be used. It is especially advantageous to prepare the compounds of the invention directly after the formation of the metal salts, without isolating the latter, in the same reaction vessel.

Furthermore, it is possible to prepare oxo-phosphine-benzodiazepines from correspondingly substituted aminobenzophenones by reaction with derivatives of aminoacetic acid derivatives, for example with the imino esters, the ortho esters, preferably with amino-acetic acid esters, according to the following reaction scheme:

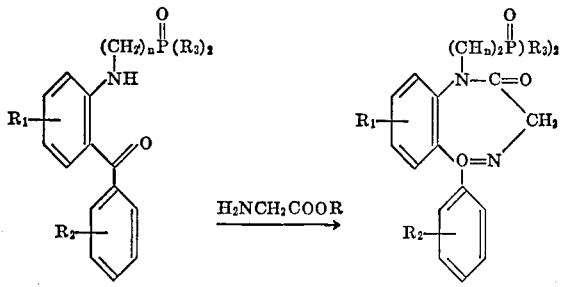

in which R represents an alkyl or aryl group; in this case, the reaction is carried out according to known methods. Under certain circumstances, it may also be of advantage to effect cyclization according to the following reaction scheme:

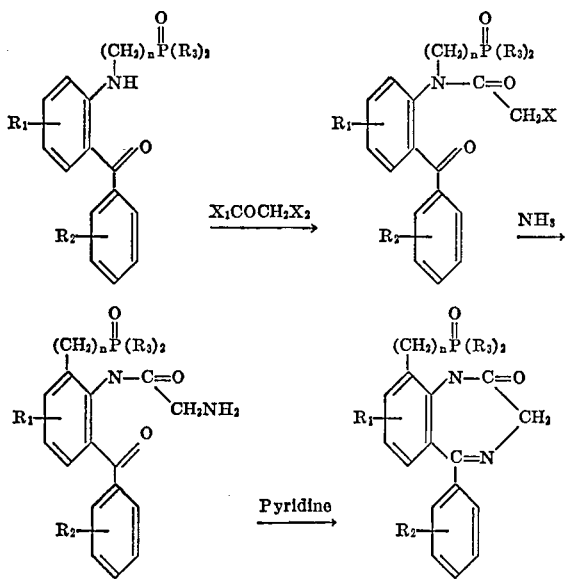

wherein $X_1$ and $X_2$ represent a halogen atom and $X_1$ in addition may represent the azido group $N_3$. Cyclization may be effected, for example in pyridine.

The process of the present invention permits the synthesis of hitherto unknown benzodiazepines which contain the oxo-phosphine grouping and which are distinguished by favourable hydrophilic properties. Thus, by using suitable phosphorus components it is possible to vary within wide limits the ratio of distribution between water and lipoids. For example, it is thus possible to prepare compounds which are easily soluble in water and which are stable in aqueous systems also at elevated temperatures.

Since the known minor tranquilizers diazepam (7-chloro - 1,3 - dihydro-1-methyl-5-phenyl-2H-1,4-benzodiazepine-2-one) and meprobamate(2,2-di-(carbamoyl-oxymethyl)-pentane) are not water-soluble and chlorodiazepoxide (7-chloro-2-methylamino-5-phenyl-3H-1,4-benzodiazepine-4-oxide) is not stable in aqueous solution, a water-soluble, chemically stable substance of the type of diazepam represents an important therapeutical progress. All of the products of the invention show a very good to sufficiently good solubility in water and have a strong protecting action against clonic persistent convulsions and maximum tonic seizures after metrazole infusion in mice (Bastian et al., J. of Pharmacol., 127, 75 (1959)) and against the provoqued electrically maximum extensor seizure in the mouse. In addition, the compounds have a potentiating effect on the narcosis produced by hexobarbital in the mouse.

Even when administered perorally, the compounds of the invention have a strong activity. In addition, they show very favourable data with regard to the acute toxicity. The good solubility of the compounds in water permits their intravenous administration without using a solubilizer. It is surprising, that the introduction of the dialkyl-oxophosphine grouping causes such a good solubility in water in the strongly hydrophobic benzodiazepine molecule and that the tranquilizing properties are maintained and the toxicity is even markedly reduced.

The compounds of the present invention may be used as medicaments in the form of pharmaceutical preparations which are suitable for enteral or parenteral application. The preparations may be in solid form, for example in the form of tablets, dragées, suppositories, capsules or in liquid form, above all in the form of aqueous solutions. If desired, they may contain the usual adjuvants and excipients or conserving agents, stabilizers, etc. They may also contain other therapeutically valuable substances.

The following examples illustrate the invention.

EXAMPLE 1

(a) 30.5 g. (0.11 mole) of 7-chloro-1,3-dihydro-5-phenyl-2H-1,4-benzodiazepine-2-one were dissolved in 200 ml. of absolute xylene and combined with 5 g. (0.11 mole) of sodium hydride (about 55% in paraffin oil). After having boiled the whole for 5 hours under reflux, 13 g. (0.13 mole) of chloromethyl-dimethyl-phosphine-oxide, dissolved in 50 ml. of absolute xylene, were added to the reaction mixture and the mixture was heated to the boiling temperature for 3 hours, while stirring. The reaction mixture was then allowed to stand overnight at room temperature. Undissolved matter was then filtered off with suction while hot, the residue was washed with hot xylene. After concentration of the filtrate under reduced pressure, the residue was freed from residual solvent by steam distillation, filtered with suction over active charcoal and washed thoroughly with hot water. The filtrate was evaporated to dryness under reduced pressure and residual amounts of water were removed by boiling of the residue in toluene in a water separator. Exhaustive extraction in a Soxhlet apparatus of the residue with cyclohexane and following recrystallization of the cyclohexane extract from xylene yielded 21.2 g. of compound (=52% of the theory). The melting point was at 174–175° C. and 193–195° C., respectively, depending on the respective crystal modification. The 7-chloro-1,3-dihydro-1-dimethyl-oxo-phosphinylmethyl - 5 - phenyl-2H-1,4-benzodiazepine-2-one was found to have a very good solubility in water already at room temperature. The structure of the compound was proved by IR (infrared)-, NMR (nuclear magnetic resonance)- and MS (mass)-spectrometry.

Calc. for $C_{18}H_{18}ClN_2O_2P$ (360.5) (percent): C, 60.0; H, 5.0; Cl, 9.9; N, 7.8; P, 8.6. Found (percent): C, 59.8; H, 5.1; Cl, 9.7; N, 8.0; P, 8.4.

(b) 50 g. (0.185 mole) of 7-chloro-1,3-dihydro-5-phenyl-2H-1,4-benzodiazepine were stirred at 40° C. into a solution of 27.5 g. (0.22 mole) of chloromethyl-dimethyl-phosphine-oxide in 340 ml. of anhydrous benzene and, after about 5 minutes, 8.5 g. (0.195 mole) of sodium hydride (about 55% in paraffin oil) were added portionwise, while stirring, in such a manner that the temperature did not exceed 55° C. The reaction mixture was then slowly heated to the boiling temperature and boiled for 4 hours under reflux. From the reaction solution, which had been filtered, optionally with addition of silica gel, there crystallized, after storage for several hours at room temperature, the main quantity of the 7-chloro-1,3-dihydro-1-dimethyl-oxo-phosphinyl-methyl - 5 - phenyl-2H-1,4-benzodiazepine-2-one; a further proportion could be isolated from the mother liquor. After recrystallization from acetone, a total of 53.5 g. (80% of the theory) of colorless crystals melting at 193–195° C., was obtained.

(c) 20 g. (0.074 mole) of 7-chloro-1,3-dihydro-5-phenyl-2H-1,4-benzodiazepine-2-one were dissolved in 150 ml. of dimethylformamide and combined with 4 g. of sodium hydride (about 55% strength in paraffin oil) (0.092 mole). The reaction mixture was stirred for 1 hour at 50° C. and the sodium salt that had formed was combined with 18 g. (0.097 mole) of methane-sulfonic acid-dimethyl-oxophosphinyl-methyl ester. After heating for 5 hours to 70° C., the reaction was almost quantitative. The solvent was removed under reduced pressure and working up was carried out as described above. The same compound was obtained in a yield of 60% and was found to correspond with all of its physical data with the substance prepared from chloromethyl-dimethyl-phosphine-oxide.

(d) The substance was furthermore prepared by reaction of 5 - chloro-2-(N-dimethyl-oxophosphinylmethyl)-amino-benzophenone (melting point 137–138° C. (from cyclohexane)) with glycine-ester hydrochloride or by reaction with bromoacetyl bromide, following amination in liquid ammonia and condensation in pyridine.

For isolating and purifying the compounds of the invention, chromatography on silica gel was used with success, whereby the yields were in general considerably improved.

EXAMPLE 2

27 g. (0.1 mole) of 7-chloro-1,3-dihydro-5-phenyl-2H-1,4-benzodiazepine-2-one were dissolved in 150 ml. of absolute xylene and combined with 5 g. (0.11 mole) of sodium hydride (about 55% strength in paraffin oil). After having boiled the whole for 5 hours under reflux, 17.5 g. (0.12 mole) of chloro-ethyl-dimethyl-phosphine - oxide, dissolved in 50 ml. of absolute xylene, were added dropwise to the reaction mixture and the whole was heated for 3 hours to the boiling temperature, while stirring. Working up of the reaction mixture was effected as described in Example 1. From a mixture of ligroine and xylene (1:1), there crystallized 15.8 g. (42% of the theory) of 7-chloro-1,3-dihydro - 1 - dimethyl - oxophosphinylethyl-5-phenyl-2H-1,4-benzodiazepine-2-one in the form of an easily water-soluble compound melting at 170–175° C. The structure of the compound was proved by IR-, NMR- and MS-spectrography.

Calc. for $C_{19}H_{20}ClN_2O_2P$ (374.5) (percent): C, 60.8; H, 5.3; Cl, 9.5; N, 7.5; P, 8.3. Found (percent): C, 61.1; H, 5.5; Cl, 9.4; N, 7.4; P, 8.0.

EXAMPLE 3

4.4 g. (0.1 mole) of sodium hydride (about 55% strength in paraffin oil) were added to 24 g. (0.089 mole) of 7 - chloro-1,3 - dihydro-5-phenyl-2H-1,4-benzodiazepine-2-one in 400 ml. of absolute toluene and the whole was boiled for 15 hours under reflux. After addition of 15 g. (0.097 mole) of 3 - chloropropyl-dimethyl-phosphine-oxide, the whole was stirred for further 8 hours under reflux, while stirring, and the sodium chloride that had precipitated was then filtered off. The solvent was removed under reduced pressure and the residue was stirred with 250 ml. of 50° C. hot water. The filtered aqueous solution was then treated with active charcoal. The benzodiazepine of the invention was isolated by exhaustive extraction with ethyl acetate. After drying over sodium sulfate, the solvent was removed by distillation under reduced pressure. Upon standing, the 7-chloro-1,3-dihydro-1-dimethyl-1-oxophosphinyl-n-propyl-5-phenyl - 2H - 1,4-benzodiazepine-2-one (16 g.=47 percent of the theory) crystallized. For purification, the compound which was found to be soluble in water was recrystallized from a mixture of benzene and cyclohexane (1:1). The structure of the compound, which was found to melt at 154° C., was proved by the data obtained by IR-, NMR- and MS-spectroscopy.

Calc. for $C_{20}H_{22}ClN_2O_2P$ (388.5) (percent): C, 61.7; H, 5.6; P, 7.98. Found (percent): C, 61.5; H, 5.6; P, 7.8.

EXAMPLE 4

30.5 g. of 7-chloro-1,3-dihydro-5-2'-chlorophenyl - 2H-1,4-benzodiazepine-2-one (0.1 mole) were dissolved in 200 ml. of absolute xylene and combined with 5 g. (0.11 mole) of sodium hydride (about 55% strength in paraffin oil). After having boiled the whole for 5 hours under reflux, 13 g. (0.1 mole) of chloromethyl-dimethyl-phosphine-oxide in 50 ml. of absolute xylene were added to the reaction mixture and the mixture was heated to the boiling temperature for 3 hours, while stirring. The reaction mixture was then allowed to stand overnight at room temperature. Working up of the reaction mixture was effected as described in Example 1.

Instead of the chloromethyl-dimethyl-phosphine-oxide, the bromomethyl-dimethyl-phosphine-oxide was used with the same success. The physical data obtained by analysis undoubtedly indicated the structure of the 7-chloro-1,3-dihydro-1-dimethyl - oxophosphinylmethyl - 5,2' - chlorophenyl-2H-1,4-benzodiazepine-2-one. Melting point 240° C. (with decomposition). Yield: 15.8 g. (40% of the theory). The compound was found to be only sparingly soluble at room temperature, but easily soluble in water 40°–50° C.

Calc. for $C_{18}H_{17}Cl_2N_2O_2P$ (395) (percent): C, 54.7; H, 4.3; Cl, 18.0; P, 7.9. Found (percent): C, 54.4; H, 4.5; Cl, 13.2; P, 7.8.

EXAMPLE 5

19 g. (0.061 mole) of 7-chloro-1,3-dihydro-5,4'-isopropylphenyl-2H-1,4 - benzodiazepine - 2 - one were dissolved in 200 ml. of absolute xylene and combined with 3.1 g. (0.068 mole) of sodium hydride (about 55% strength in paraffin oil). After having boiled the whole for 5 hours under reflux, 9 g. (0.09 mole) of chloromethyl-dimethyl-phosphine-oxide in 30 ml. of absolute xylene were added and the mixture was heated for 3 hours to the boiling temperature. The reaction mixture was then allowed to stand overnight at room temperature and worked up as described in Example 1. The yield of 7-chloro-1,3-dihydro-1-dimethyl - oxo - phosphinylmethyl - 5,4'-isopropylphenyl-2H-1,4 - benzodiazepine-2-one was 11 g. (45% of the theory). Melting point: 150–153° C. At 40°–50° C., the compound was found to be easily soluble in water.

Calc. for $C_{21}HClN_2O_2P$ (402.5) (percent): C, 62.5; H, 6.0; Cl, 8.8; N, 7.0; P, 7.7. Found (percent): C, 62.3; H, 5.8; Cl, 8.6; N, 6.8; P, 7.5.

EXAMPLE 6

7 - Chloro-1,3-dihydro-1-(diethyl-oxophosphinylmethyl)-5-phenyl-2H-1,4-benzodiazepine-2-one 27 g. (0.1 mole) of 7-chloro-1,3-dihydro-5-phenyl-2H-1,4-benzodiazepine-2-one were stirred for 5 hours under reflux in 200 ml. of absolute xylene with 5 g. (0.11 mole) of sodium hydride (about 55% in paraffin oil). The reaction mixture was cooled and 22 g. (0.11 mole) of bromomethyl-diethyl-phosphine-oxide, dissolved in 100 ml. of hot absolute xylene were added thereto dropwise. The reaction mixture was then stirred for 3 hours under reflux. The hot solution was filtered, the NaBr was separated by filtration and washed with hot toluene and the combined filtrates were concentrated as far as possible. The residue was dissolved in hot water, the solution was clarified with active charcoal and the water was removed by distillation under reduced pressure. Residual traces of humidity were eliminated by boiling with toluene on a water separator. The toluene was removed by distillation and the residue was recrystallized from xylene. 17.6 g. of the above-specified compound were obtained, which was found to melt at 178–180° C. (45% of the theory).

Calc. for $C_{20}H_{22}ClN_2O_2P$ (388.5) (percent): C, 61.7; H, 5.7; N, 7.2; P, 8.0. Found (percent): C, 61.5; H, 5.9; N, 7.4; P, 7.8.

EXAMPLE 7

7-Chloro-1,3-dihydro-1-(diethyl-oxophosphinylmethyl)-5-(4'-isopropyl)-phenyl-2H-1,4-benzodiazepine-2-one 31 g. (0.1 mole) of 7-chloro-1,3-dihydro-5,4'-isopropylphenyl-2H-1,4-benzodiazepine-2-one were stirred for 5 hours under reflux in 200 ml. of absolute xylene with 5 g. (0.11 mole) of sodium hydride (about 55% strength in paraffin oil). The reaction mixture was slightly cooled and then 22 g. (0.11 mole) of bromomethyl-diethyl-phosphine oxide, dissolved in 100 ml. of hot absolute xylene, were added thereto dropwise. After further stirring for 3 hours under reflux, undissolved matter was filtered off, the residue was washed with hot toluene and the combined filtrates were concentrated under reduced pressure. The residue was dissolved in absolute benzene and purified over a column of silica gel. As eluant, methylene chloride with increasing quantities of acetone was used. After removal of the eluant by distillation under reduced pressure, the residue was dissolved in hot petroleum ether and clarified with active charcoal. The petroleum ether was removed by distillation under reduced pressure, whereupon 45 g. of the above-specified compound were obtained in the form of a non-distillable oil.

Calc. for $C_{23}H_{28}ClN_2O_2P$ (430.5) (percent): C, 61.7; H, 5.7; N, 7.2; P, 8.0. Found (percent): C, 61.5; H, 5.7; N, 7.4; P, 8.3.

EXAMPLE 8

7-Chloro-1,3-dihydro-1-(di-n-propyl-oxophosphinylmethyl)-5-(2'-chloro)-phenyl-2H-1,4-benzodiazepine-2-one 13 g. (0.043 mole) of 7-chloro-1,3-dihydro-5,2'-chlorophenyl-2H-1,4-benzodiazepine - 2-one were heated for 6 hours, while stirring mechanically during the whole time, in 250 ml. of boiling xylene with 2.6 g. of sodium hydride (55% strength in paraffin oil) (0.06 mole). The suspension was cooled to 60° C. and then 13.5 g. (0.056 mole) of methanesulfonylmethyl-di-n-propyl-phosphine-oxide were added dropwise. The mixture was then stirred for 13 hours under reflux, the reaction solution was separated by filtration from the sodium salt that had precipitated and concentrated under reduced pressure. The product was isolated after addition of 100 ml. of water by thorough shaking with ethyl acetate. The ethyl acetate phase was dried over sodium sulfate. After removal of the organic solvent, 16 g. of the above-specified compound (65% of the theory) were obtained; the analytically pure compound was obtained after recrystallization from xylene and showed a melting point of 157–160° C.

Calc. for $C_{22}H_{25}Cl_2N_2O_2P_1$ (451.3) (percent): C, 58.6; H, 5.6; Cl, 15.7; N, 6.2; P, 6.8. Found (percent): C, 58.5; H, 5.8; Cl, 15.55; N, 6.1; P, 6.7.

We claim:

1. Pharmaceutical preparation having tranquilizing properties containing an effective amount of an active compound of the formula

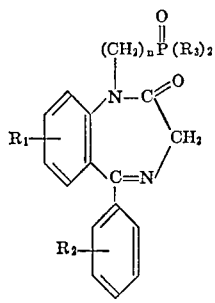

in which $R_1$ and $R_2$, which may be identical or different, each represent a hydrogen atom, a nitro group, a halogen atom or the trifluoromethyl group and $R_2$ in addition may represent a straight chain or branched alkyl group having 1 to 6 carbon atoms, $R_3$ represents a straight chain or branched alkyl group having 1 to 3 carbon atoms, and $n$ is a number from 1 to 6, and a pharmaceutically tolerable adjuvant or excipient.

2. Pharmaceutical preparation as defined in claim 1 wherein the active compound is 7-chloro-1,3-dihydro-1-dimethyl-oxophosphinylmethyl - 5 - phenyl-2H-1,4-benzodiazepine-2-one.

3. Pharmaceutical preparation as defined in claim 1 wherein the active compound is 7-chloro-1,3-dihydro-1-dimethyloxophosphinylethyl - 5 - phenyl-2H-1,4-benzodiazepine-2-one.

4. Pharmaceutical preparation as defined in claim 1 wherein the active compound is 7-chloro-1,3-dihydro-1-dimethyl-oxophosphinyl-n-propyl - 5 - phenyl-2H-1,4-benzodiazepine-2-one.

5. Pharmaceutical preparation as defined in claim 1 wherein the active compound is 7-chloro-1,3-dihydro-1-dimethyl-oxophosphinylmethyl - 5 - (2'-chlorophenyl)-2H-1,4-benzodiazepine-2-one.

6. Pharmaceutical preparation as defined in claim 1 wherein the active compound is 7-chloro-1,3-dihydro-1-dimethyl-oxophosphinylmethyl - 5 - (4'-isopropylphenyl)-2H-1,4-benzodiazepine-2-one.

7. Pharmaceutical preparation as defined in claim 1 wherein the active compound is 7-chloro-1,3-dihydro-1-diethyl-oxophosphinylmethyl - 5 - phenyl-2H-1,4-benzodiazepine-2-one.

8. Pharmaceutical preparation as defined in claim 1 wherein the active compound is 7-chloro-1,3-dihydro-1-diethyl - oxophosphinylmethyl - 5 - (4' - isopropylphenyl)-2H-1,4-benzodiazepine-2-one.

9. Pharmaceutical preparation as defined in claim 1 wherein the active compound is 7-chloro-1,3-dihydro-1-di-n-propyl-oxophosphinylmethyl - 5 - (2'-chlorophenyl)-2H-1,4-benzodiazepine-2-one.

10. Method of tranquilizing which comprises administering to a patient a tranquilizingly effective amount of the active compound defined in claim 1.

11. Method of tranquilizing as defined in claim 10 wherein the active compound is 7-chloro-1,3-dihydro-1-dimethyl-oxophosphinylmethyl - 5 - phenyl-2H-1,4-benzodiazepine-2-one.

12. Method of tranquilizing as defined in claim 10 wherein the active compound is 7-chloro-1,3-dihydro-1-dimethyl-oxophosphinylethyl - 5 - phenyl-2H-1,4-benzodiazepine-2-one.

13. Method of tranquilizing as defined in claim 10 wherein the active compound is 7-chloro-1,3-dihydro-1-dimethyl-oxophosphinyl-n-propyl-5-phenyl - 2H - 1,4-benzodiazepine-2-one.

14. Method of tranquilizing as defined in claim 10 wherein the active compound is 7-chloro-1,3-dihydro-1-dimethyl - oxophosphinylmethyl - 5 - (2' - chlorophenyl)-2H-1,4-benzodiazepine-2-one.

15. Method of tranquilizing as defined in claim 10 wherein the active compound is 7-chloro-1,3-dihydro-1-dimethyl-oxophosphinylmethyl - 5 - (4'-isopropyl-phenyl)-2H-1,4-benzodiazepine-2-one.

16. Method of tranquilizing as defined in claim 10 wherein the active compound is 7-chloro-1,3-dihydro-1-diethyl-oxophosphinylmethyl - 5 - phenyl-2H-1,4-benzodiazepine-2-one.

17. Method of tranquilizing as defined in claim 10 wherein the active compound is 7-chloro-1,3-dihydro-1-diethyl - oxophosphinylmethyl - 5 - (4' - isopropylphenyl)-2H-1,4-benzodiazepine-2-one.

18. Method of tranquilizing as defined in claim 10 wherein the active compound is 7-chloro-1,3-dihydro-1-di-n-propyl-oxophosphinylmethyl - 5 - (2'-chlorophenyl)-2H-1,4-benzodiazepine-2-one.

References Cited
UNITED STATES PATENTS 3,371,085   2/1968   Reeder et al. _____ 260—239.3 D
3,738,982   6/1973   Wolf et al. _____ 260—239.3 D STANLEY J. FRIEDMAN, Primary Examiner